UNITED STATES PATENT OFFICE.

MAX MEYER, OF NEW YORK, N. Y.

QUININ METHYL-DIHYDRAZIN PERCHLORATE AND PROCESS OF MAKING SAME.

SPECIFICATION forming part of Letters Patent No. 681,505, dated August 27, 1901.

Application filed December 26, 1900. Serial No. 41,069. (Specimens.)

*To all whom it may concern:*

Be it known that I, MAX MEYER, a citizen of the United States, residing in the borough of Manhattan, in the city, county, and State of New York, have invented a certain new and useful Chemical Compound and the Method of Making the Same, of which the following is a specification.

My invention relates to a new readily-soluble chemical compound containing the vegetable non-volatile alkaloids of the cinchona and theobroma group, combined with the members of the hydrazine series, and the method of making the same.

The materials employed by me for the production of the new chemical compound consist of quinin hydrochlorid, caffein, and antipyrin. I prefer to take these ingredients in about the following proportions—that is, one hundred parts of quinin hydrochlorid, known by the chemical formula of $C_{20}H_{24}N_2O_2HCl2H_2O$; forty-eight and one-half parts of caffein having the chemical formula $C_8H_{10}N_4O_2$, and one and one-half parts of antipyrin having the chemical formula $C_{11}H_{12}N_2O$. These materials are thoroughly mixed together and subjected for a period of about one hour to a temperature of 100° centigrade, at which temperature the materials flux and the mass becomes substantially molten. This is then allowed to cool and is thereafter powdered to any desirable degree of fineness and is then dissolved in seventy-five parts of distilled water at 80° centigrade temperature. This hot solution is then filtered at this temperature into shallow open vessels and is thereafter put in a very much cooler place, where the thermometer registers about 30° centigrade, and in which temperature the material is allowed to crystallize. The solution crystallizes out in white minute, needle-shaped crystals, which crystals have a levogyric rotary power and are lustrous. These crystals form the new substance or compound and are separated from the solution by pouring the same off and allowing the crystals to dry.

This new chemical substance or compound is odorless, has a bitter taste, and the crystals range from a white color to colorless. The material is permanent in the air and not hygroscopic. Its melting-point is approximately 120° centigrade, and the said material is alkaline in reaction and is not poisonous.

Two parts of this new chemical substance dissolve in one part of cold water; five parts thereof dissolve in one part of boiling water. The said material is soluble in alcohol, benzin, benzene, chloroform, and ether. The said material also may be combined with most of the alkaloids and active principles of drugs forming preparatons of specific therapeutic action. As a drug in the treatment of various diseases or ailments—such as acute pneumonia, diphtheria, nephritis, and influenza—the same can be administered internally, hypodermically, and in ways well known to the medical fraternity, either alone or in combination with other substances, without the same in any case losing its high pharmacodynamic action. Prescriptions for acute pneumonia would be substantially as follows: For internal use, infusion of leaves of digitalis 1.0:180.0, my new chemical substance 2.0, and saccharin 0.75. For external application, my new chemical substance 5.0, chloroform 37.5, alcohol 12.5, and pure olive-oil 45.5, one dram three times a day to be rubbed into the skin over the lungs. Hypodermically, atropine sulfate 0.01, my new chemical substance 10.00, and distilled water 10.00, one cubic centimeter to be injected once each day until the crisis sets in.

This new compound is not isomeric with quinin, caffein, or antipyrin, either alone or in any combination. The reactions for the above-named substances do not answer for said new chemical substance, as its reaction is alkaline, while the reaction of quinin hydrochlorid, caffein, or antipyrin is neutral.

The new chemical substance is more soluble than any of the materials from which it is formed, not only in water, but in alcohol and in other liquids, and while quinin hydrochlorid, caffein, and antipyrin are quite difficult to dissolve, there is no difficulty in dissolving the new substance. The reaction which takes place in the combination of these substances is not accompanied with effervescence and proceeds gradually. The filtrate remains clear and does not contain any salts, all the constituents—that is, the quinin and the hydrazin—entering into the combination if they have been mixed in proper proportions, and the following equation is believed to represent the course and the result of the reaction:

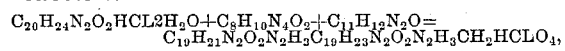
$$C_{20}H_{24}N_2O_2HCL2H_2O + C_8H_{10}N_4O_2 + C_{11}H_{12}N_2O =$$
$$C_{19}H_{21}N_2O_2N_2H_3C_{19}H_{23}N_2O_2N_2H_3CH_2HCLO_4,$$

the chemical name of which would be homoquinin-methyldihydrazin-perchlorate.

As a matter of comparison of some of the characteristics of my new chemical compound with the corresponding characteristics of the basic ingredients composing the same—viz: quinin hydrochlorid, caffein, and antipyrin—I refer to the following table:

| | New compound quinin H.CC. | | Caffein. | Antipyrin. |
|---|---|---|---|---|
| Crystals | Fine needles | Needle shape. | Long silky needles. | Rhombic prisms. |
| Odor | Nihil | Nihil | Nihil | Nihil. |
| Color | Light-yellow white. | White | White | Gray-white, tinged red. |
| Taste | Bitter | Bitter | Faintly bitter | Mild bitter. |
| Melting-point | 120° | 198° | 225° | 113° |
| Soluble in $H_2O$ | 2:1 | 1:34 | 1:90 | 1:1 |
| Reaction | Alkaline | Neutral | Neutral | Neutral. |
| With $H_2S_4O_4$ | Yellow color | Nihil | Nihil | Nihil. |
| With $H_2S_4O_4$ and $HN_4O_3$ | Yellow-green | do | do | Red-yellow. |
| With picric acid | Yellow ppt | Ppt | do | Nihil. |

I claim as my invention—

1. As a new chemical compound, homoquinin-methyldihydrazin-perchlorate derived from quinin hydrochlorid, caffein and antipyrin, having the general formula hereinabove given, which forms fine light yellow white auricular crystal needles soluble in water and of bitter taste and which has a melting-point of 120° and an alkaline reaction, substantially as specified.

2. The method herein specified of forming a new chemical compound derived from quinin hydrochlorid, caffein and antipyrin consisting in melting a mixture of these substances, cooling and powdering the resultant substance and crystallizing, substantially as specified.

3. The method herein specified of forming homoquinin-methyldihydrazin-perchlorate, consisting in taking molecular proportions of quinin hydrochlorid, caffein and antipyrin, thoroughly mixing the same together, subjecting the same to a high temperature sufficient to flux and cause the mass to become molten, allowing the same to cool, then powdering the mass, dissolving and crystallizing out the new chemical compound and separating and drying the crystals from the remaining liquid, substantially as described.

Signed by me this 22d day of December, 1900.

MAX MEYER.

Witnesses:
GEO. T. PINCKNEY.
S. T. HAVILAND.